(12) United States Patent
Rosin et al.

(10) Patent No.: US 9,941,690 B2
(45) Date of Patent: Apr. 10, 2018

(54) DISCONNECTOR FOR HIGH VOLTAGE

(75) Inventors: Francesco Rosin, Eraclea (IT); Vincenzo Girlando, Padua (IT)

(73) Assignee: ALSTOM TECHNOLOGY LTD., Baden (CH)

( * ) Notice: Subject to any disclaimer, the term of this patent is extended or adjusted under 35 U.S.C. 154(b) by 435 days.

(21) Appl. No.: 14/418,230

(22) PCT Filed: Aug. 2, 2012

(86) PCT No.: PCT/IT2012/000243
§ 371 (c)(1),
(2), (4) Date: Jan. 29, 2015

(87) PCT Pub. No.: WO2014/020621
PCT Pub. Date: Feb. 6, 2014

(65) Prior Publication Data
US 2015/0194806 A1    Jul. 9, 2015

(51) Int. Cl.
H02J 7/00 (2006.01)
H02J 9/00 (2006.01)
H02H 7/26 (2006.01)
H01H 33/02 (2006.01)

(52) U.S. Cl.
CPC ............ H02H 7/26 (2013.01); H01H 33/027 (2013.01)

(58) Field of Classification Search
CPC ............................. H01H 33/027; H02H 7/26
USPC ............................................................ 307/67
See application file for complete search history.

(56) References Cited

U.S. PATENT DOCUMENTS

| | | | | |
|---|---|---|---|---|
| 5,000,539 A | * | 3/1991 | Gareis | G02B 6/4483 |
| | | | | 174/70 R |
| 5,295,207 A | * | 3/1994 | Dupraz | G01R 15/241 |
| | | | | 324/96 |
| 2009/0321392 A1 | * | 12/2009 | Akesson | H01H 33/027 |
| | | | | 218/143 |

FOREIGN PATENT DOCUMENTS

| CN | 2751422 | * | 1/2006 |
|---|---|---|---|
| CN | 2751422 Y | | 1/2006 |
| CN | 201601388 U | | 10/2010 |
| EP | 0237776 A2 | | 9/1987 |
| EP | 1939907 A1 | | 7/2008 |
| FR | 2430112 A1 | | 1/1980 |

OTHER PUBLICATIONS

International Search Report for corresponding application PCT/IT2012/000243 filed Aug. 2, 2012; dated May 22, 2013.
Written Opinion for corresponding application PCT/IT2012/000243 filed Aug. 2, 2012; dated May 22, 2013.

* cited by examiner

*Primary Examiner* — Rexford Barnie
*Assistant Examiner* — Toan Vu
(74) *Attorney, Agent, or Firm* — GE Global Patent Operation; Scott R. Stanley

(57) ABSTRACT

A disconnector for high voltage, including columnar supporting elements which are electrically isolating and are adapted to support electromechanical elements of opening and closing a circuit or an electrical line. At least one columnar supporting element, which is tubular, supports an optical current transformer, the optical fiber of which, surrounded by protection elements, extends inside the tubular columnar supporting element.

5 Claims, 2 Drawing Sheets

DISCONNECTOR FOR HIGH VOLTAGE

The present invention relates to a disconnector for high voltage.

Disconnectors are the components of an electrical grid which cooperate to ensure the safety of the plant, being the elements adapted to permit or interrupt and prevent the passage of current between two points of the grid.

As a consequence, information about the physical status and operating parameters of a disconnector are considered to be of particular importance.

In particular, exact knowledge of the intensity of current in transit through the disconnector is strategic.

For the exact measurement of the current intensity, measurement devices called 'optical current transformers' are known today which are adapted to have a polarized light beam, passing through a detection ring, influenced by the magnetic field produced by the electric current passing through a conducting element which is arranged so as to pass through the detection ring.

The optical signal produced is routed to the digital electronic unit for controlling and managing the plant, of which the disconnector is part, through an optical fiber which is arranged to pass inside a tubular columnar isolation element that extends for a height that corresponds substantially to the height of the structural columnar isolation elements which support the electromechanical components that physically make up the disconnector.

The optical fiber is conveniently immersed in a protective dielectric gel with which the tubular columnar isolation element is filled.

Optical current transformers are nowadays increasingly widespread and appreciated for their intrinsic capacity to generate an optical signal, which is more precise and easier to manage by interconnection lines and by digital and electronic control units than conventional electrical signals, and is thus particularly adapted to 'intelligent' or so-called 'smart grids' for managing electricity. Such next generation grids are currently in development.

Such an optical transformer, while increasingly widespread and appreciated, still has the drawback of being a separate device, which, in addition to constituting an additional cost with respect to the disconnector, must be mounted specially on the disconnector with which it is intended to be used, with obvious use of specialist labor and dedicated components.

The aim of the present invention is to provide a disconnector for high voltage which is capable of overcoming the limitations of the disconnectors known today.

Within this aim, an object of the invention is to provide a disconnector that is capable of emitting a signal that can be carried over optical fiber and thus easily managed by a digital electronic control unit with which the disconnector is interconnected.

Another object of the invention is to provide a disconnector with performance capabilities that are not inferior to similar conventional disconnectors.

Another object of the invention is to provide a disconnector for high voltage, which can be produced using known systems and technologies.

This aim and these and other objects which will become better apparent hereinafter are achieved by a disconnector for high voltage, comprising columnar supporting elements which are electrically isolating and are adapted to support electromechanical means of opening and closing a circuit or an electrical line, characterized in that at least one columnar supporting element, which is tubular, supports an optical current transformer, the optical fiber of which, surrounded by protection means, extends inside said tubular columnar supporting element.

Further characteristics and advantages of the invention will become better apparent from the description of a preferred, but not exclusive, embodiment of the disconnector according to the invention, which is illustrated by way of non-limiting example in the accompanying drawings, wherein.

Figure 1:
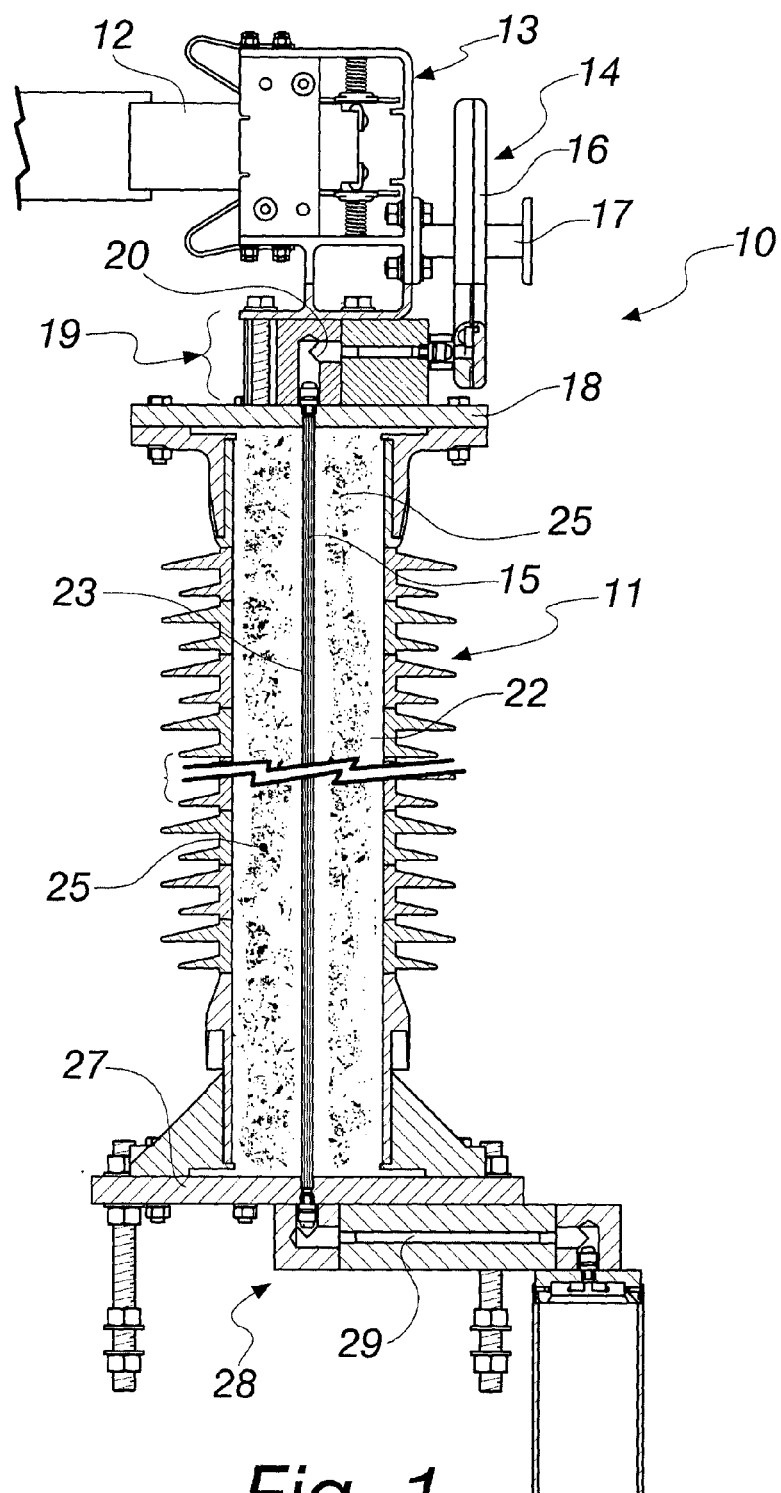
FIG. 1 is a sectional front view of a portion of a disconnector according to the invention.
Figure 2:
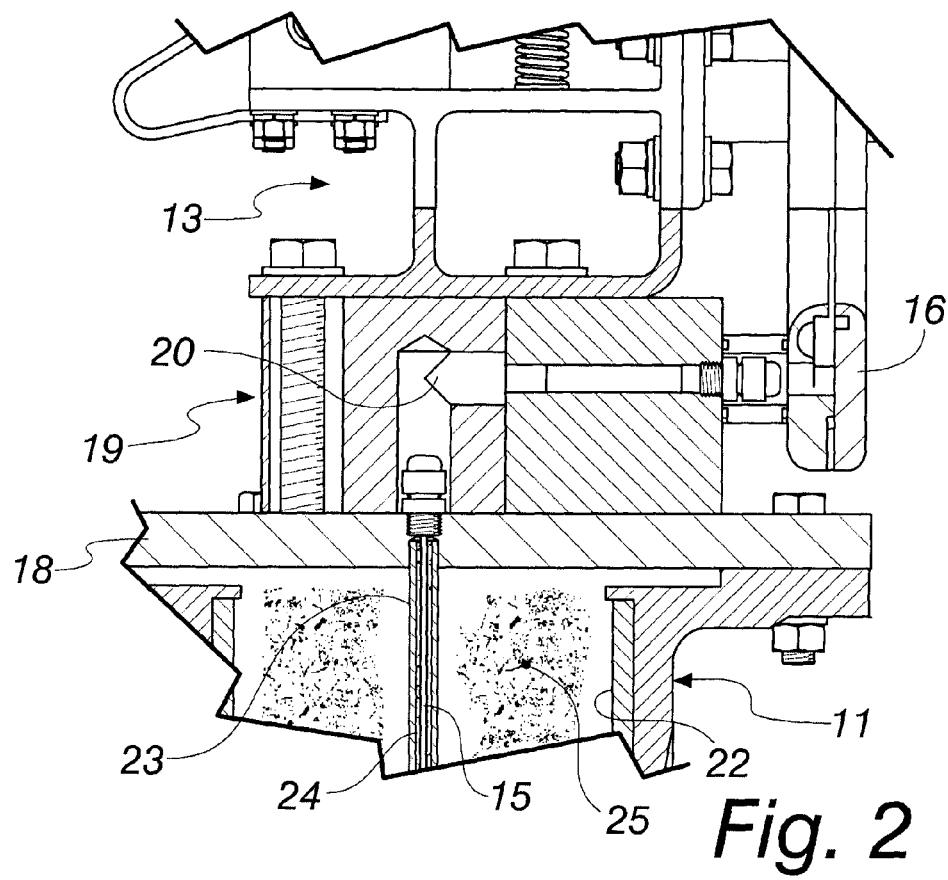
FIG. 2 is a view of a first detail of FIG. 1.
Figure 3:
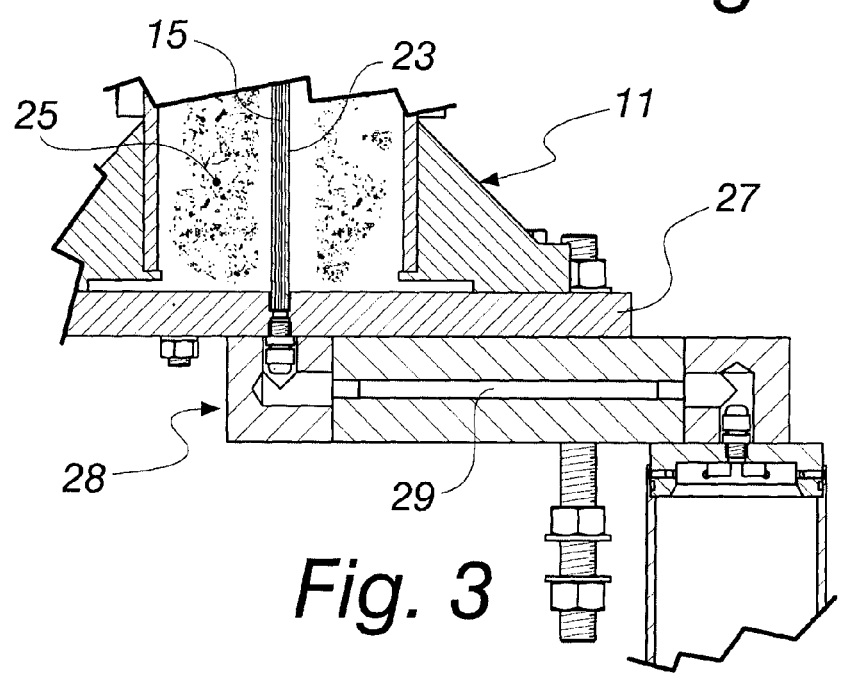
FIG. 3 is a view of a second detail of FIG. 1.

With reference to the figures, a disconnector for high voltage according to the invention is generally designated with the reference numeral 10.

The disconnector 10 described herein by way of non-limiting example of the invention is of the horizontal semi-pantograph type, and comprises electrically isolating columnar supporting elements, of which one, lateral, is shown and designated with 11, and which are adapted to support the electromechanical means of opening and closing a circuit or an electrical line.

The electromechanical means that make up the disconnector 10 should be understood as being of known type, and are represented here by the end of a cross-member 12, which has a contact that is adapted to be inserted in a group of contact sockets 13, which are supported by the columnar element 11 and interconnected with the electrical line that the disconnector is adapted to interrupt.

The peculiarity of the invention lies in the fact that the columnar supporting element 11, which is tubular, supports an optical current transformer 14, the optical fiber 15 of which, surrounded by protection means better described hereinbelow, extends inside the tubular columnar supporting element 11.

The optical transformer 14, which is also of known type, comprises a detection ring 16, which is mounted at the group of contact sockets 13 and axially passed through by the principal conducting element 17 which is fixed directly to the group of contact sockets 13.

Fixed between the group of sockets 13 and a head plate 18 of the columnar supporting element 11 is a block 19 inside which a channel 20 is provided for the passage and deviation of the optical signal from the detection ring 16 to the optical fiber 15 inside the columnar supporting element 11.

The columnar supporting element 11, which is insulating and tubular, is made up in a known manner of annular bodies made of a polymeric material or from porcelain.

The means of protection of the optical fiber 15 inside the columnar supporting element 11 are constituted by a containment tube 23 inside which the optical fiber 15 extends, and inside the containment tube 23 the optical fiber 15 is immersed in a dielectric gel 24.

The space in the cavity 22 between the containment tube 23 and the inner wall of the cavity 22 is filled with a foamed dielectric gel 25.

The containment tube 23 extends between the head plate 18 and a base plate 27 which closes the columnar supporting element 11 in a lower region.

Placed below the base plate 27 is a second block 28 inside which a second channel 29 is provided for the deviation of the optical signal to subsequent means of transmission thereof, which should be understood as being of known type and are not shown for the sake of simplicity.

In practice it has been found that the invention fully achieves the intended aim and objects.

In particular, with the invention a disconnector has been devised which is capable of emitting a signal that can be carried over optical fiber and thus easily managed by a digital electronic control unit with which the disconnector is interconnected.

Moreover, with the invention a disconnector has been devised which does not need to be provided with a special current measurement device in order to be interconnected with a 'smart' electrical grid, since the disconnector integrates an optical transformer which is capable of emitting a digital signal that is easy to manage with conventional means.

Thus, with the invention a disconnector has been devised which does not require further components, or the use of specialist labor, in order to be provided with a tool for measuring the intensity of current.

What is more, with the invention a disconnector has been devised with performance capabilities that are not inferior to similar conventional disconnectors.

Last but not least, with the invention a disconnector for high voltage has been devised which can be made using known systems and technologies.

The invention, thus conceived, is susceptible of numerous modifications and variations, all of which are within the scope of the appended claims. Moreover, all the details may be substituted by other, technically equivalent elements.

In practice the materials employed, as well as the contingent dimensions and shapes, may be any according to requirements and to the state of the art.

Where technical features mentioned in any claim are followed by reference signs, such reference signs have been inserted for the sole purpose of increasing the intelligibility of the claims and accordingly such reference signs do not have any limiting effect on the interpretation of each element identified by way of example by such reference signs.

The invention claimed is:

1. A disconnector for high voltage, comprising columnar supporting elements which are electrically isolating and are adapted to support electromechanical means of opening and closing a circuit or an electrical line, wherein at least one columnar supporting element, which is tubular, supports an optical current transformer, an optical fiber of which, surrounded by protection means, extends inside said tubular columnar supporting element;

wherein said protection means of the optical fiber inside the columnar supporting element are constituted by a containment tube inside which the optical fiber extends, said optical fiber being immersed in a dielectric gel inside said containment tube; and wherein a space is defined in a cavity between the containment tube and an inner wall of said cavity, said space being filled with a foamed dielectric gel.

2. The disconnector according to claim 1, wherein said optical transformer comprises a detection ring, which is mounted at the group of contact sockets, and is axially passed through by the principal conducting element which is fixed directly to the group of contact sockets.

3. The disconnector according to claim 2, wherein fixed between the group of sockets and a head plate of the columnar supporting element is a block inside which a channel is provided for passage and deviation of an optical signal from the detection ring to the optical fiber inside the columnar supporting element.

4. The disconnector according to claim 1, wherein said containment tube extends between said head plate and a base plate which closes the columnar supporting element in a lower region.

5. The disconnector according to claim 4, wherein placed below the base plate is a second block inside which a second channel is provided for the passage and deviation of the optical signal to subsequent means of transmission thereof.

* * * * *